(12) United States Patent
Tremmel et al.

(10) Patent No.: US 9,103,027 B2
(45) Date of Patent: *Aug. 11, 2015

(54) POLISHING AND ELECTROLESS NICKEL COMPOSITIONS, KITS, AND METHODS

(71) Applicant: Accu-Labs, Inc., Chicago, IL (US)

(72) Inventors: Peter Tremmel, Chicago, IL (US); Orville Broch, Cherry Valley, IL (US); Stephen Brent Cornwell, Lemont, IL (US)

(73) Assignee: Accu-Labs, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/562,918

(22) Filed: Dec. 8, 2014

(65) Prior Publication Data

US 2015/0093514 A1 Apr. 2, 2015

Related U.S. Application Data

(63) Continuation of application No. 13/904,510, filed on May 29, 2013, now Pat. No. 8,936,672.

(60) Provisional application No. 61/663,009, filed on Jun. 22, 2012, provisional application No. 61/772,092, filed on Mar. 4, 2013.

(51) Int. Cl.
| | |
|---|---|
| C23C 18/16 | (2006.01) |
| C23C 18/34 | (2006.01) |
| C23C 18/36 | (2006.01) |
| B65D 81/32 | (2006.01) |
| C09K 13/00 | (2006.01) |

(52) U.S. Cl.
CPC ............... *C23C 18/36* (2013.01); *B65D 81/32* (2013.01); *C09K 13/00* (2013.01); *C23C 18/1617* (2013.01); *C23C 18/1633* (2013.01); *C23C 18/34* (2013.01)

(58) Field of Classification Search
CPC  C23C 18/1617; C23C 18/1633; C23C 18/34; C23C 18/36; B65D 81/32
USPC ............. 106/1.22, 1.27; 427/443.1; 206/223
See application file for complete search history.

(56) References Cited

U.S. PATENT DOCUMENTS

| | | | | |
|---|---|---|---|---|
| 4,483,711 | A * | 11/1984 | Harbulak et al. | 106/1.22 |
| 4,600,609 | A * | 7/1986 | Leever et al. | 106/1.22 |
| 5,269,838 | A * | 12/1993 | Inoue et al. | 106/1.27 |
| 5,306,335 | A * | 4/1994 | Senda et al. | 106/1.22 |
| 5,338,342 | A * | 8/1994 | Mallory, Jr. | 106/1.22 |
| 5,364,459 | A * | 11/1994 | Senda et al. | 106/1.22 |
| 5,718,745 | A * | 2/1998 | Itoh et al. | 106/1.22 |
| 5,910,340 | A * | 6/1999 | Uchida et al. | 427/443.1 |
| 6,273,943 | B1 * | 8/2001 | Chiba et al. | 106/1.22 |

(Continued)

*Primary Examiner* — Helene Klemanski
(74) *Attorney, Agent, or Firm* — Fitch, Even, Tabin & Flannery LLP

(57) ABSTRACT

Disclosed are various methods, kits, and compositions in the field of electroless nickel plating and chemical polishing. An electroless nickel plating composition may include a surfactant-brightener; a coupler; a bismuth metallic stabilizer; and organosulfur stabilizer and a bismuth complexer. Prior to plating, a substrate may be polished with a polishing composition that includes a surface blocker and a surface leveler. When practiced in accordance with the preferred teachings described herein, the electroless nickel plating composition is capable of providing a mirror-bright, lustrous finish, and has good leveling properties. The composition may be made without lead or cadmium.

28 Claims, 4 Drawing Sheets

(56) References Cited

U.S. PATENT DOCUMENTS

| | | | |
|---|---|---|---|
| 6,800,121 B2 * | 10/2004 | Shahin | 106/1.22 |
| 6,911,269 B2 * | 6/2005 | Hollander et al. | 106/1.27 |
| 8,182,594 B2 * | 5/2012 | Hino et al. | 106/1.22 |
| 8,308,858 B2 * | 11/2012 | Stewart et al. | 106/1.22 |
| 8,936,672 B1 * | 1/2015 | Tremmel et al. | 106/1.22 |

* cited by examiner

FIG. 2
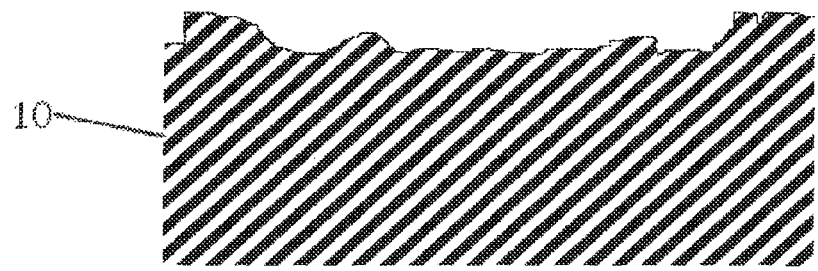
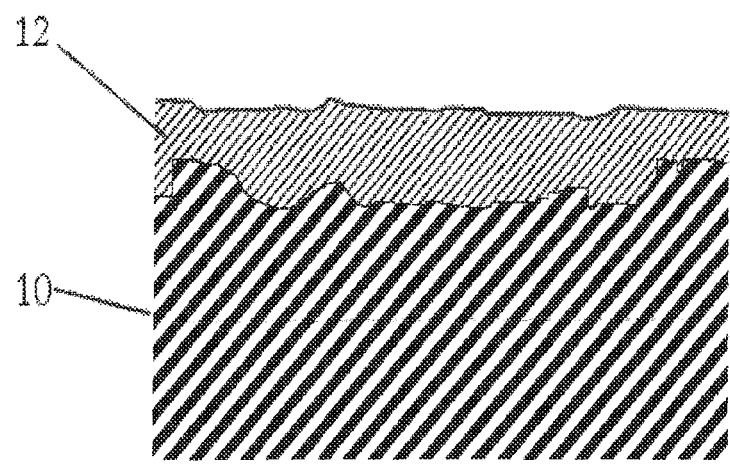
FIG. 3

POLISHING AND ELECTROLESS NICKEL COMPOSITIONS, KITS, AND METHODS

CROSS-REFERENCE TO RELATED APPLICATIONS

This application is a continuation of U.S. application Ser. No. 13/904,510, filed May 29, 2013, now U.S. Pat. No. 8,936,672, which claims benefit of U.S. Provisional Application No. 61/663,009, filed Jun. 22, 2012, and U.S. Provisional Application No. 61/772,092, filed Mar. 4, 2013, which are hereby incorporated herein by reference in their entirety.

TECHNICAL FIELD

The present application generally is in the fields of chemical polishing and metal plating. Many embodiments are in the field of electroless nickel plating and chemical polishing.

BACKGROUND

Numerous types of materials are often polished to impart various qualities, including, but not limited to, a desired amount of reflectivity and/or surface roughness. For example, in some cases it may be desirable to brighten a material to have a mirror-like reflectivity, such as for ornamental appearances. Further, it may be desirable to polish the material to have a smooth surface, such as for minimizing wear on a moving part.

Traditionally, materials have been polished using mechanical means. For example, steel articles requiring a high degree of luster and reflectivity are usually polished using mechanical means including, but not limited to, vibratory bowls, burnishing barrels, polishing lathes with belts, and tumbling media. However, such methods are not especially effective for parts having complicated shapes or which are otherwise fragile. Other methods are also known, including electrochemical methods for polishing. However, these methods also may not be suitable for complicated parts and otherwise require expensive equipment to achieve the desired results.

Further, many plating methods are known in the art, which can be used with or without polishing. Plating can be used to provide better corrosion and/or wear resistance. In this regard, the material is generally plated or coated with a nobler metal.

Conventional plating techniques include, for instance, galvanic plating and electroless plating. In galvanic plating, an externally applied electric current is used in conjunction with a solution that contains metal ions to thereby cause galvanic deposition of metal onto the surface of an object to be plated. Electroless plating, in contrast, connotes plating from a solution that contains metal or metal ions, without the necessity of external electric current application. Electroless nickel plating generally employs a plating solution that includes nickel ions (typically Ni2+ in a sulfate solution) and a reducing ion such as hypophosphite, and that typically further includes adjuncts such as complexing agents, buffering agents, and anti-pit agents. An object to be coated with nickel is introduced to the solution and the solution is brought to an elevated temperature, whereupon the reducing agent reduces the nickel ions to form nickel metal ($Ni^0$). This causes the nickel metal to be plated onto the object.

A number of properties are desired of an electroless nickel plating solution. In many embodiments, an electroless nickel plating solution will impart a bright or semi-bright surface finish on the object to be plated. Generally, it is desirable that the electroless nickel plating solution be a low-pitting solution to mitigate against pits on the surface of the plated object. The solution should have good aging properties, by which is contemplated that, as the solution is consumed in use, the byproducts of the plating reaction, which include phosphates and other byproducts, do not cause degradation of performance, dulling of the finish, or the like.

Another desired property is shelf stability. In many embodiments, an electroless nickel plating solution is prepared in situ from two precursor solutions, one solution including nickels ions and the other including the reducing agent. In such embodiments, it is desirable that the two precursor solutions be themselves shelf-stable.

Many heretofore known electroless nickel plating solutions employ significant levels of lead or cadmium to assist in attaining one or more of the above-noted desirable properties. More recently, it has become desired to reduce or eliminate lead, cadmium, and similar heavy metals in light of toxicity and environmental concerns. Under the ROHS directive (with reference to directive 2002/95/EC of the European Parliament, Jan. 27, 2003), for example, lead, mercury, cadmium, hexavalent chromium, polybrominated biphenyls, and polybrominated diphenyl ethers are limited or restricted in certain commercial applications. In light of this ROHS directive and similar standards that restrict the use of lead and cadmium, it is desirable to provide an electroless nickel plating solution that attains some or all of the above-noted advantages without necessitating the inclusion of lead or cadmium.

SUMMARY

The invention provides, in various embodiments, methods and kits in the field of electroless nickel plating and chemical polishing.

In one form, a chemical polishing composition and method are provided for polishing a ferritic substrate. The composition includes a ferritic surface blocker and a fluoridic surface leveler. The surface blocker includes an oxidizing agent and a wetting agent and the surface leveler includes a fluoride salt and an oxidant. The surface blocker and the surface leveler are provided in amounts effective to polish a ferritic surface. The chemical polishing composition and method may be used to reduce the roughness of the surface and also increase the reflectivity. Such a composition and method may be used with complex part geometries where traditional polishing techniques are not suitable or fail to achieve the desired level of polishing.

According to one form, the fluoride salt is selected from the group consisting of sodium fluoride, potassium fluoride, lithium fluoride, calcium fluoride, ammonium bifluoride, and mixtures thereof. The oxidant may be selected from the group consisting of ammonium nitrate, sodium nitrate and potassium nitrate. The oxidizing agent may be selected from the group consisting of ammonium persulfate, sodium persulfate, hydrogen peroxide, sodium peroxide, and mixtures thereof.

In another form, the composition may further include an oxidizing acid, a complexer and a wetting agent. The oxidizing acid present in an amount effective to drive ferritic removal and may be selected from the group consisting of sulfuric acid, nitric acid, phosphoric acid, hydrofluoric acid, fluoroboric acid, and methanesulfonic acid and mixtures thereof. The complexer may be present in an amount effective to inhibit redeposition of iron with the complexer being selected from the group consisting of citric acid, malic acid, lactic acid, succinic acid, and oxalic acid. The wetting agent may include a non-ionic or ionic type surfactant.

In some forms, the chemical polishing composition and method may be used as a precursor step to a further plating or coating process. For example, the chemical polishing process can be used prior to a nickel plating process, including conventional electroless nickel plating processes or the electroless nickel process described herein.

The chemical polishing composition and method may provide a number of benefits that increases the performance of plating or coating processes. For example, as the surface is smoother after polishing, with reduced microroughness, the orientation of the plated material may be improved. Further, the polished surface may include additional micro-active sites which may improve bonding between the surface and the plated material. These changes can lead to further benefits, such as requiring less plating material, such as nickel, to be used in the plating process. Similarly, less energy is required in the process with less environmental impact. Moreover, the polished and plated surface may have significantly improved reflectivity and corrosion performance than by plating alone.

Some aspects of the invention may be embodied in kits, or systems, that include multiple compositions. In some embodiments, a kit for plating includes a first container that includes a first composition and a second container that includes a second composition. The first composition contains nickel and the second composition contains a reducing agent, such as hypophosphite. The first and second containers need not be physically affixed to one another, but generally, the first and second compositions are combinable to form an electroless nickel plating composition.

In some embodiments, the first composition includes a surfactant-brightener present in an amount effective to enhance luster of an object plated with the electroless nickel plating composition formed when the first and second compositions are blended together. The first composition further includes a coupler present in an amount effective to inhibit oil-out of the surfactant-brightener. In other embodiments, not mutually exclusive with regard to the embodiment described above, the second composition includes a bismuth metallic stabilizer in an amount effective to inhibit plate-out of the electroless nickel plating composition and further includes a bismuth complexer being present in the amount effective to inhibit precipitation of bismuth.

In some embodiments, the invention contemplates method for preparing an electroless nickel plating composition, the method including blending first and second compositions, the first composition including nickel and the second composition including a reducing agent. The first or the second composition, or both compositions, may be as heretofore described.

The kit may include a third container that includes a third composition. The third composition may include a reducing agent and at least one of a pH buffer and an anti-pit agent. Generally, the second composition that includes a reducing agent also will include a pH buffer and/or an anti-pit agent. Where a third composition is provided, the proportion of the reducing agent to the buffer and/or anti-pit agent is different in the third composition from this proportion in the second composition. It is contemplated that the first and second compositions may be used as "makeup" compositions in the initial preparation of the electroless nickel plating composition, while the first and third compositions may be used as a replenisher composition to replenish hypophosphite.

In other embodiments, the invention contemplates a method for electroless nickel plating. An electroless nickel plating composition that includes nickel and a reducing agent is provided, and to this composition is introduced an object to be plated. The object to be plated is introduced to the electroless nickel plating composition under conditions sufficient to cause nickel to be plated onto a surface of the object. In some embodiments, the electroless nickel plating composition includes a reducing agent, nickel, a surfactant-brightener, and a coupler. In other embodiments, not mutually exclusive with regard to the heretofore described embodiment, the electroless nickel plating composition includes a bismuth metallic stabilizer and a bismuth complexer. The method may contemplate replenishing the electroless nickel plating composition with nickel and/or with a reducing agent.

In some embodiments, the invention contemplates a first electroless nickel plating composition as described herein. In other embodiments, the invention contemplates a second or a third electroless nickel plating composition as described herein.

BRIEF DESCRIPTION OF THE DRAWINGS

FIG. 2 is a cross-sectional view of the surface shown in FIG. 1 illustrating irregularities in the surface topology.

FIG. 3 is a cross-sectional view similar to FIG. 2, showing the object after plating.

Figure 1:
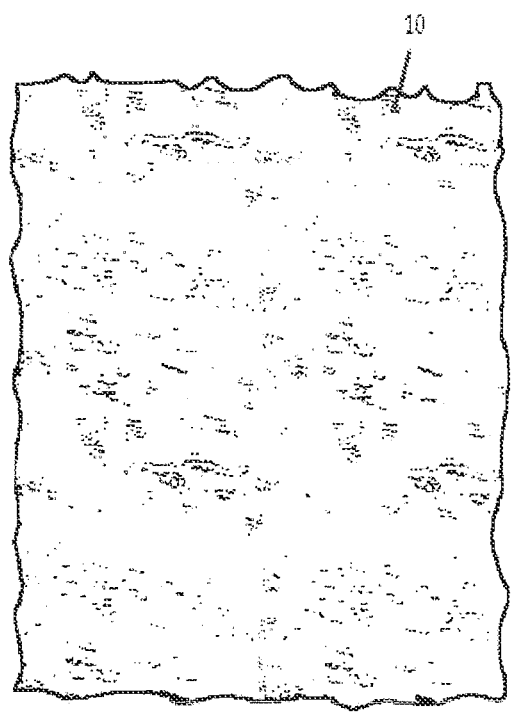
FIG. 1 is a plan view of a surface to be plated.
Figure 4:
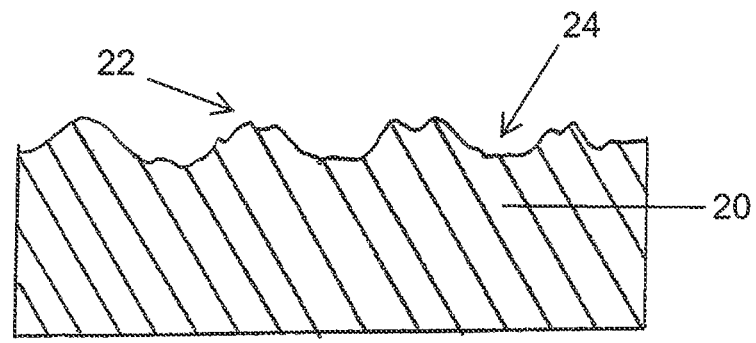
FIG. 4 is a representation of a cross sectional view of a surface to be polished.

The foregoing figures are representational views and are intended to depict the leveling phenomenon afforded by some embodiments of the present invention, and are not intended to represent the results of any particular example.

DETAILED DESCRIPTION

Generally, the embodiments described herein are contemplated to be useful in connection with metal plating compositions, kits, and methods, including but not limited to nickel plating, and also including but not limited to electroless nickel-plating. It is contemplated that in some embodiments one or more of the herein described polishing compositions, kits, or methods may be used in connection with galvanic or other plating techniques. In other embodiments, it is contemplated that the herein described polishing compositions, kits, or methods may be used in conjunction with other metals for other metallic plating purposes. When used in connection with electroless nickel plating, however, certain embodiments of the disclosed polishing compositions, kits, or methods are believed to provide various advantages as stated herein. The invention is not deemed to be limited to a composition, kit, or method that provides all of the stated advantages.

In one form, an optional chemical polishing method may be included prior to electroless nickel plating. Additionally or alternatively, the polishing method may be performed with other forms of plating or without any plating whatsoever. In this regard, a chemical polishing composition and method are provided that can be used on a number of different materials, including, but not limited to, steel and related metals. The chemical polishing composition may be used to decrease surface roughness, increase reflectivity and/or remove surface contaminants.

In one form, the chemical polishing composition may comprise a ferritic surface blocker and a fluoridic surface leveler. The chemical polishing composition includes amounts of the ferritic surface blocker and fluoridic surface leveler effective to polish a ferritic surface. Without intending to be limiting, it is hypothesized that the surface blocker may help in filling and/or blocking valleys in the surface while leaving peaks in the surface relatively unblocked. In this regard, the fluoridic surface leveler is then able to remove material from the peaks while generally not removing significant amounts of material from the valleys. Therefore, the overall roughness of the material is decreased. Further, the reflectivity of the surface may also be improved.

According to one embodiment, the ferritic surface blocker can include one or more components including, but not limited to, an oxidizing agent and a wetting agent. The components in the ferritic surface leveler may be prepared as a solution in advance or may be combined just prior to or during use.

The oxidizing agent may include any number of different oxidizing agents suitable for use in the chemical polishing composition. For example, the oxidizing agent may include ammonium persulfate, sodium persulfate, hydrogen peroxide, sodium peroxide, and mixtures thereof. The oxidizing agent may be used in the composition to provide a variety of functions, and is intended to block the surface of a substrate to be polished. While not intending to limit the invention to a particular theory of operation, it is believed that the oxidizing agent will cause an oxygen-containing layer to form on portions of the substrate. The oxygen-containing layer may be a gaseous layer. The oxidizing agent may be provided in any amount suitable for this purpose. In some embodiments, the concentration range is 0.5-4.0 mole/liter, and in some cases 1.0-3.0 mole/liter.

The wetting agent may include any suitable component, such as a non-ionic surfactant. The wetting agent may be used in the composition to wet the surface to permit action by the oxidizing agent as discussed above. In one form, the wetting agent is selected from the group consisting of dodecyl maltosides, ethoxylated amines, octylphenol ethoxylates, and sodium ethylhexyl sulfate. The surfactant may be present in any amount suitable to wet the surface of the substrate. In some embodiments, the surfactant concentration range is 0.005-2.0 gram/liter, or preferred 0.01-0.5 gram/liter.

The fluoridic surface leveler may include one or more components including, but not limited to one or more fluoride salts and an oxidant. The fluoridic surface leveler may be used to remove material from the surface to be polished. In this regard, the fluoridic surface leveler may include multiple components that provide varying levels of aggressiveness for removing material. For example, the fluoridic surface leveler may include a bulk surface removing component that removes material in a generally more aggressive manner to the overall surface or exposed surface. The fluoridic surface leveler may also include a more targeted surface removing component that targets more specific sites of the surface. In other forms, the fluoridic surface leveler only includes a bulk surface removing component. In this regard, there is no targeted surface material removing component and/or other components in the composition may provide more targeted surface material removal.

The fluoridic surface leveler includes a fluoride salt and an oxidant. The fluoride salt may comprise one or more of a variety of different components. For example, the fluoride salt may include sodium fluoride, potassium fluoride, lithium fluoride, calcium fluoride, ammonium bifluoride, and mixtures thereof. The fluoride salt may be included in a variety of different amounts effective to polish the ferritic surface. For example, the fluoride salt may be present in the range of 0.1-4.0 mole/liter, and in some embodiments 0.2-2.0 mole/liter. Similarly, the oxidant can include one or more of a number of different oxidant components. For example, the oxidant may include ammonium nitrate, sodium nitrate, potassium nitrate, and mixtures thereof. The oxidants may be used in the composition to polish the ferritic surface and may be present in any amount effective for that purpose. For example, in one form, the oxidant is present in the range of 0.05-2.0 mole/liter, in some cases 0.1-1.0 mole/liter.

The chemical polishing composition may also include a complexer or complexing agent. The complexer may include one or more components the help inhibit redeposition of iron. According to one form, the complexer may include citric acid, malic acid, lactic acid, succinic acid, oxalic acid and mixtures thereof. The complexer may be used in the composition in an amount effective to inhibit redeposition of iron by forming a complex with iron that has been removed from the surface of the substrate. The complexing agent may be provided in any amount effective for this purpose. For example, in one form, the complexing agent may be provided in a range of 0.05-2.0 mole/liter, and in some cases 0.1-1.0 mole/liter.

In one form, the chemical polishing composition may also include an oxidizing acid in an amount effective to drive ferritic removal by providing acidity. The oxidizing acid may perform other functions in the composition. Any number of different oxidizing acids may be included, such as sulfuric acid, nitric acid, phosphoric acid, hydrofluoric acid, fluoroboric acid, and methanesulfonic acid, and mixtures thereof. The oxidizing acid may be used in the composition in any suitable amount for the intended purpose. The oxidizing acids may be provided, for example, in amounts in the range 0.05-2.0 mole/liter and in some cases 0.1-1.0 mole/liter.

According to one form, the fluoride salt may utilized for dissolving (chemically attacking) a steel article since iron (Fe) ions eluted from the article may then be stabilized as complex ions of $FeF_6^{3-}$ or the like from the addition of the complexing agents. The exposed surface is chemically active and free of contaminants that affect further processing steps. This chemically pure surface has found to improve overall adhesion of deposits.

The compositions described herein may be provided in the form of a kit, the kit containing a first and second container, and each container containing a portion of the polishing composition. The containers need not be of any suitable form, but generally may be sealed or sealable containers to permit transport. The containers need not be physically connected to one another. In some embodiments the first and second compositions may be concentrated, that is, they may contain a greater proportion of the functional ingredients to water than would be necessary for the surface treatment process. "Concentrated" does not necessarily connote or imply removal of water from a less concentrated composition. A kit that contains concentrated components in this form will contain relatively less water than would be included when the compositions are ready for commercial use, thus facilitating shipping and handling of the compositions. In many embodiments, the functional ingredients of the first and second composition will be present from 5-25 times, preferably about 10 times, the amounts required in ordinary commercial use.

The composition or kit may be used in a polishing method, by which a substrate to be polished is introduced to a polishing composition for a time and under conditions effective to cause the surface to be polished. A number of factors may influence the polishing rate. For example, the ratio of oxidizing acid to oxidizing agent may influence the polishing rate (i.e., metal dissolution rate) along with the solution temperature. In one form, at a constant bath temperature, as the acid concentration increases, so does the metal removal rate/polish rate. During chemical polishing, the reaction is exothermic thereby increasing the solution temperature which thus increases the polishing rate. In one form, where the concentration of the fluoride salt is more than 2 mol/L, it may become difficult to control the polishing rate, but if the concentration is less than 0.2 mol/L, the polishing rate is less than 1 μm/min, such that the polishing efficiency may be too low. In one form, it is preferable that the polishing rate is from 1 to 100 μm/min., whereby the concentration of the fluoride salt is from 0.2 to 2 mol/l, to obtain the preferable polishing rate. In one form, where the fluoride salt has a concentration of from 0.3 to 1.5 mol/L, a practical polishing rate of 1 to 50 μm/min is obtained, the polishing rate is readily maintained and controlled. The surface treatment solution temperature may be in any suitable range. In some cases, the solution temperature is in the range of 55-110° F., and in some cases 70-90° F.

In one form, the chemical polishing composition includes ammonium bifluoride in an amount of about 0.2 mole/liter to about 0.7 mole/liter, fluoroboric acid in an amount of about 0.1 mole/liter to about 0.5 mole/liter, sodium nitrate in an amount of about 0.1 mole/liter to about 0.5 mole/liter, oxalic acid in an amount of about 0.08 mole/liter to about 0.16 mole/liter, hydrogen peroxide in an amount of about 1.0 mole/liter to about 3.0 mole/liter and a surfactant in an amount of about 0.03 gm/liter to about 0.08 gm/liter. In such composition, it is hypothesized that the hydrogen peroxide and the surfactant may function to block a portion of the surface as a result of the gassing of hydrogen peroxide. Further, it is hypothesized that the ammonium bifluoride will attack the surface in a gross manner while the sodium nitrate will attack the surface in a more fine fashion. Additionally, it is expected that the fluoroboric acid will help drive the reaction forward with acidity. Fluoroboric acid may be used as it is generally non-fuming, though other materials may also be used, it is believed that the oxalic acid will function as a complexer which will bind with iron ions and impurities, thereby helping to keep them from redepositing on the surface.

Figure 5:
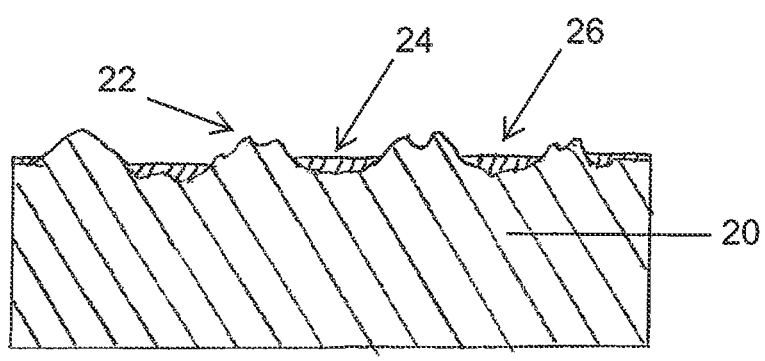
FIG. 5 is a representation of the surface shown in FIG. 4, illustrating blocking of the surface.

Referring to FIGS. 4-7, what is understood to be the operation of the chemical polishing composition will be discussed. As found in FIG. 4, a cross-section of a ferritic material 20, such as steel, is shown having various peaks 22 and valleys 24. The number and size of the peaks and valleys help define the relative roughness of the surface of the ferritic material 20. Referring now to FIG. 5, a chemical polishing composition is combined with the ferritic material 20 such that a surface blocking layer 26 at least partially covers the ferritic material 28. As seen in FIG. 5, the surface blocking layer 26 is generally positioned adjacent at least some of the valleys 24 while leaving at least a portion of the peaks 22 exposed. It should be noted that the surface blocking layer 26 may also cover the peaks 22, but that the relative thickness of the surface blocking layer 26 covering the peaks 26 is thinner than the valleys 24.

Figure 6:
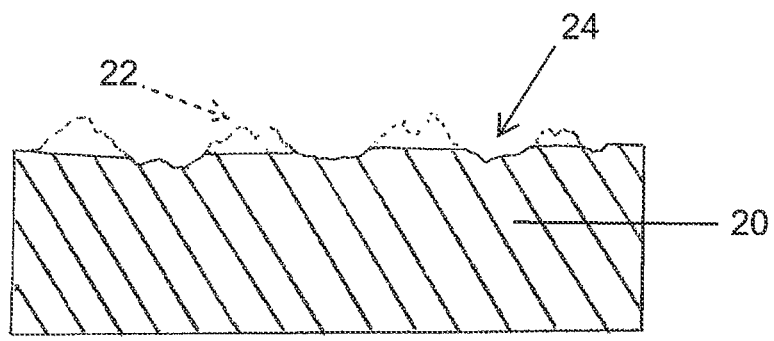
FIGS. 6 and 7 are a representation of the surface shown in FIG. 4 after polishing, showing the original etched surface in FIG. 6 in phantom lines.
Figure 7:
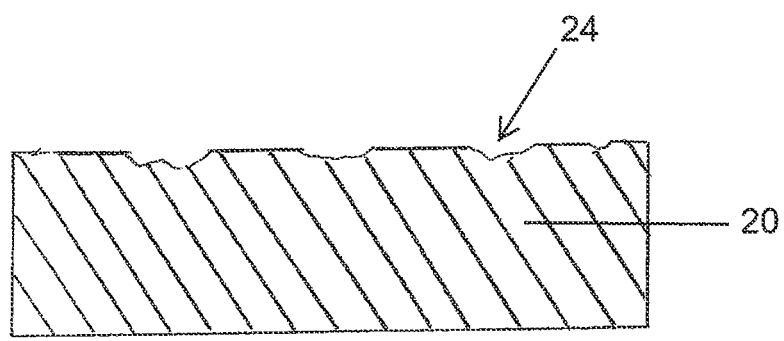

The fluoridic surface leveler contacts and generally removes at least a portion of the peaks 26, as shown in dashed lines in FIG. 6. The resulting polished surface is shown in FIG. 7 whereby the overall roughness of the ferritic material 20 has decreased relative to the starting roughness shown in FIG. 4.

The following parameters are based on applications of the surface treatment on steel, and on additional applications of the surface treatment on steel with subsequent plating of the test panels. These are exemplary and are not intended to be limiting. The overall reflectivity as measured by utilizing methods DIN 65530/ASTM D523/ISO 2813/BS 3900, and employs the use of a TRI-GLOSS meter. While not limiting the invention, it is believed that typical reflectivity measured in gloss units (GU) of processed steel through chemical polishing solution increased can increase 50-75% over the untreated materials. The surface roughness, which may be measured and tested utilizing test methods outlined in DIN 4728/4762, ISO/DIS 4287, employs the use of a profilometer. Again without intending to limit the invention, it is believed that surface roughness ($_R$A) values may decrease (thereby indicating improved surface leveling) by 20-40% overall upon polishing.

In one form, the above-described polishing solutions can be used to polish a material such as steel. For example, a hardened steel article can be cleaned and neutralized and then polished utilizing the above-described polishing solutions. The polishing solution can remove impurities and smooth the surface to thereby improve adhesion of later applied coatings. For example, after polishing the material can be coated, such as using an electroless nickel process as described below in more detail.

Heretofore the polishing composition, kits, and methods have been described. Turning to the electroless nickel plating composition, kits, and methods, the embodiments are not meant to be mutually exclusive with regard to the polishing compositions, kits, and methods, but to the contrary it is contemplated that a substrate may be polished and then may be caused to be plated with nickel via an electroless nickel plating process as described below.

In many embodiments, the invention provides an electroless nickel plating composition that is capable of providing a mirror-bright leveling, low-pit or pit-free nickel plating. The composition may be formulated to have good aging properties, such that the plating properties remain sufficiently consistent through a bath life of 6-10 metal turnovers (MTOs). The electroless nickel plating composition generally may be formed in situ from first and second compositions, the first composition including nickel and the second composition including hypophosphite or another reducing agent. In some embodiments, the electroless nickel plating composition is formed other than via blending of first and second compositions. When first and second compositions are employed, they may be composed to be shelf-stable at room temperature for a period of at least two weeks. The electroless nickel plating composition may, if desired, include lead or cadmium, but preferably are fashioned without lead or cadmium but are able to accomplish the mirror-bright deposit of nickel in the absence of lead and cadmium. The composition may allow for plating at moderate solution pH, typically a pH ranging from 4.0-7.0 and preferably 4.2-5.7, and moderate temperature in the range of 135-210° F., preferably 145-195° F. In some embodiments, where the amount of nickel to be plated is not mandated by specification, it is believed that less nickel will be required to result in plating of comparable appearance than in certain conventional processes.

The electroless nickel plating composition may be formed from two precursor "make-up" compositions noted herein as first and second compositions. The compositions described herein may be solutions with no solid phase, or the composition may contain solid particles. Generally, the first composition includes nickel and the second composition includes hypophosphite or another reducing agent. Precursor compositions may be in a ready-to-use form or may be in the form of concentrates that typically would be diluted with water, either before or after blending together, for use with electroless nickel plating.

The first composition generally includes nickel, which is provided as a positive nickel ion (typically $Ni^{2+}$). The nickel is supplied as the sulfate, chloride, sulfamate, acetate, or other suitable salt. The electroless nickel plating composition may include nickel in any suitable amount, but preferably includes nickel in the range of 0.5-12 gm/L, more preferably from 4-8 gm/L nickel. To achieve the foregoing, when a kit of first and second compositions is provided, the concentration of nickel in the first composition may take any suitable range, for instance a range of from 20-180 g/L Ni (metal), and in some embodiments from 50-130 g/L Ni (metal) The second composition includes hypophosphite, which may be supplied as sodium, potassium, or ammonium salt. Generally, the electroless nickel plating composition includes a reducing agent in any suitable amount. When the reducing agent is hypophosphite, it may be used in the range of 20-40 gm/L sodium hypophosphite, preferably 24-34 gm/L sodium hypophosphite. To achieve the foregoing, when a kit of first and second compositions is provided, the concentration of reducer in the second composition or third composition may range in any suitable amount, and preferably ranges from 60-600 g/L sodium hypophosphite, more preferably 150-300 g/L sodium hypophosphite.

The electroless nickel plating composition need not include, but preferably does include, other adjuncts useful in connection with electroless nickel plating. For example, the electroless nickel plating composition may include complexing agents, which generally are chelators which are added to prevent the precipitation of nickel by the reaction products from the hypophosphite reaction of nickel ions. Typical complexing agents include, for example, malic acid, lactic acid, citric acid, glycolic acid, succinic acid, glycine, and alike. The electroless nickel plating composition may include a complexing agent in the range of from above 0.1-5.0 mol/L, preferably 1.0-3.0 mol/L, or any other amount suitable to inhibit precipitation of nickel.

The electroless nickel may further include a pH buffering agent. This pH buffering agent may be added in any amount suitable for pH buffering, preferably an amount from 2-20 gm/L, and more preferably 6-12 gm/L. The buffering agent may include, for instance, acetic acid, boric acid, citric acid, or the like. Some pH buffers also will provide complexing. For example, it is contemplated that citric acid will add to complexing and buffering properties.

The electroless nickel plating composition may further include an anti-pit agent. This is typically a low-foam, high-temperature-tolerant surfactant which is added to reduce surface tension and to thereby reduce or eliminate clinging bubbles that may lead to pitting defects on the surface. One suitable anti-pitting agent is NIAPROOF 08 sold by Niacet Corp. of Niagara Falls, N.Y. NIAPROOF 08 is believed to comprise sodium 2-ethylhexyl sulfate. Another suitable anti-pit agent is believed to be AEROSOL MA 80-1, sold by Cytec Industries of Woodland Park, N.J. AEROSOL MA 80-1 is believed to comprise sodium dihexyl sulfosuccinate. Other suitable anti-pit surfactants as are common the nickel plating industry or otherwise found to be suitable may be employed. Such agents may be used in any suitable amount, typically a range of 0.01 gm/L to 1 gm/L, and more preferably 0.05-0.5 gm/L.

The electroless nickel plating composition further may include an oxygen stabilizer. When an oxygen stabilizer is employed, any suitable oxygen stabilizer may be used. One suitable oxygen stabilizer is believed to be potassium iodate. The oxygen stabilizer is believed to add stability and to inhibit decomposition of the electroless nickel plating composition. The oxygen stabilizer may be used in any amount suitable for this purpose, such as a range of 0.5-600 mg/L, preferably 5-300 mg/L.

The heretofore described complexing agents, pH buffering agents, anti-pit agents, and oxygen stabilizer may be present in one or both of the first and second compositions that are used to prepare electroless nickel plating composition. When the electroless nickel plating composition is prepared from first and second "makeup" compositions as described herein, one or a combination of these components may be present in the first composition, and one or a combination of these components may be present in the second composition. When a third composition for replenishment of reducing agent is provided, some or all of these components may be provided in the third composition.

The electroless nickel plating composition, and precursor compositions, preferably are formulated in the substantial or complete absence of lead and in the substantial or complete absence of cadmium. Levels of lead and cadmium preferably are sufficiently low as to be undetectable. It is possible that some embodiments of the inventive electroless nickel composition, or precursor compositions, will include trace amounts of lead or cadmium. It is contemplated that in other embodiments it may be desirable to include functional amounts of lead or cadmium. Generally, however, in many embodiments it is preferred that the composition be ROHS-compliant and that levels of lead and cadmium be as low as possible.

The electroless nickel plating composition may include a metallic stabilizer, generally a bismuth metallic stabilizer. This stabilizer is added to inhibit spontaneous plate-out of the nickel in the composition and is believed to contribute to low-level brightness. This is believed to be due to the tendency of the metallic stabilizer to codeposit with the nickel. When employed, the metallic stabilizer should be used in any suitable amount effective to inhibit spontaneous plate-out. It is believed that in the electroless nickel plating composition a suitable amount will range from 0.1-7.0 mg/L, preferably 0.2-3.5 mg/L. The concentration of bismuth in the precursor second composition or in the third composition may take any suitable range, and for instance may range from 0.5-300 mg/L Bi (metal), preferably 5-150 mg/L Bi (metal). In some embodiments, it is contemplated that the bismuth metallic stabilizer may be present in the first composition, or in all three first, second, and third compositions.

When the metallic stabilizer is employed, the electroless nickel plating composition preferably includes a bismuth complexer. The bismuth complexer is an ingredient that is believed to form a stable soluble complex compound with bismuth and thereby to inhibit the precipitation of bismuth in the plating solution and in concentrate products. One suitable bismuth complexer is sodium nitrilotriacetate (NTA sodium salt), which is believed to form the complex bismuth sodium triglycollamate. The bismuth complexer may be employed in any amount suitable for this purpose, preferably an amount ranging from 2-500 mg/L and preferably 5-200 mg/L in the electroless nickel plating composition. The concentration of bismuth complexer in the precursor second composition or in the third composition may be any suitable amount. For example, NTA sodium salt may be present in the second or third composition in an amount ranging from 10-20,000 mg/L NTA sodium salt, preferably 50-5,000 mg/L NTA sodium salt. Again, in some embodiments it is contemplated that the bismuth complexer may be present in the first composition, or in all three first, second, and third compositions.

The electroless nickel plating composition further may include an organosulfur stabilizer. The organosulfur stabilizer is a sulfur-base composition that is believed to prevent or inhibit spontaneous plate-out of the composition and to contribute grainy low level luster to the composition. Suitable organosulfur stabilizers include for instance, thiourea, thioglycolic acid, mercaptobenzothiazole, thiuronium, methiomine, thiocyanate, and mixtures thereof. When employed in the electroless nickel plating composition, the organosulfur stabilizer is preferably present in an amount sufficient to inhibit spontaneous plate-out. It is believed that suitable amounts range from 0.05-5.0 mg/L, preferably 0.1-2.0 mg/L. To achieve this, the concentration of organosulfur stabilizer in the second or third compositions may be any suitable amounts, for instance 0.25-500 mg/L organosulfur stabilizer, preferably 0.5-200 mg/L organosulfur stabilizer. In some embodiments it is contemplated that the organosulfur stabilizer may be present in the first composition, or in all three first, second, and third compositions.

The electroless nickel plating composition further may include a surfactant-brightener. This is a nonionic surfactant which is believed to contribute mirror-bright properties and leveling characteristics. The surfactant-brightener may be, for example, selected from among nonyl and octyl-phenoxy-polyethoxyethanol having an HLB (hydrophilic/lipophilic balance) in the range of about 12.0-18.0. When employed, the surfactant-brightener should be used in any amount effective to enhance luster of an object plated with the electroless nickel plating composition. It is believed that suitable amount in the electroless nickel plating composition will range from 0.5-500 mg/L, preferably 1.0-100 mg/L. When provided the first composition or in the third composition, the concentration of the surfactant-brightener may be any suitable amount, for instance, 5-10,000 mg/L surfactant-brightener, and preferably 10-2000 mg/L surfactant-brightener. In some embodiments, it is contemplated that the surfactant-brightener may be present in the second composition or in the third composition.

The surfactant-brightener is believed to have a tendency to rapidly "oil-out" of the plating solution in some instances, which can lead to cloudy-streaked deposits and less than desired plating properties. When used, the surfactant-brightener preferably is employed in conjunction with a coupler. The coupler is an anionic dispersant which is provided in any amount effective to inhibit oil-out of the surfactant-brightener. A suitable anionic dispersant may be selected from naphthalene sulfonates, such as alkali or alkyl naphthalene sulfonate. In some embodiments, the coupler may contribute low-luster brightness to the electroless nickel plating composition. When employed, the coupler may be used in any suitable amount, typically 10-2000 mg/L and preferably 20-500 mg/L. The concentration of the coupler in the first precursor composition or in the third composition may be any suitable amount, for instance, 50-20,000 mg/L coupler and preferably 100-10,000 mg/L coupler. In some embodiments, it is contemplated that the coupler may be present in the second composition or in the third composition.

Some or all of the forgoing materials preferably are provided in the electroless nickel plating composition. As heretofore described, the electroless nickel plating composition may be prepared in situ by the plater from one or more precursor compositions, including a first makeup composition that comprises nickel and a second makeup composition that comprises a reducer. The first composition may be contained in a first container and the second composition may be contained in a second container. In many embodiments, the first composition will include a surfactant-brightener and a coupler, and the second composition will include a bismuth metallic stabilizer and a bismuth complexer and optionally an organosulfur stabilizer. It is contemplated in other embodiments that the first composition may include the bismuth metallic stabilizer and the bismuth complexer and optionally the organosulfur stabilizer and the second composition may include the surfactant-brightener and coupler.

The first and second compositions may be provided in the form of a kit, or system, that includes first and second containers, namely, a first container that contains the first composition and a second container that contains the second composition. The containers need not be of any suitable form, but generally may be sealed or sealable containers to permit transport. The containers need not be physically connected to one another. In some embodiments the first and second compositions may be concentrated, that is, they may contain a greater proportion of the functional ingredients to water than would be necessary for plating purposes. "Concentrated" does not necessarily connote or imply removal of water from a less concentrated composition. A kit that contains concentrated components in this form will contain relatively less water than would be included when the compositions are ready for commercial use, thus facilitating shipping and handling of the compositions. In many embodiments, the functional ingredients of the first and second composition will be present from 5-25 times, preferably about 10 times, the amounts required in ordinary commercial use for plating purposes.

In use, the plater may receive a kit that includes first and second compositions as described herein. If the kit is provided in a concentrated form, the plater may add water to achieve the desired concentration of functional ingredients. This addition of water may occur before or after blending the first and second compositions together to form an electroless nickel plating composition. For use in an electroless plating process, an object to be plated, such as a plastic or metallic object, is introduced to the electroless nickel plating composition. The pH of the electroless nickel plating composition preferably is or is brought to a pH of around 4.0-7.0, more preferably 4.2-5.7, and the electroless nickel plating composition is brought to a temperature in the range of about 135° F. to 210° F., preferably 145° F. to 195° F. Via the chemical reduction of nickel ions, the object to be plated will become coated with nickel. Periodically, it may be necessary to replenish the electroless nickel plating composition with nickel and with reducing agent. This is particularly true as the nickel solution is aged through more than 0.2 MTO. In replenishing the electroless nickel plating composition, any suitable compositions that employ nickel and that employ a reducing agent, respectively, may be employed. In many embodiments, the first composition may be employed to replenish the electroless nickel plating composition with nickel, and the second composition may be employed to replenish the electroless nickel plating composition with the reducing agent. Preferably, a third composition that includes a reducing agent also may be employed and may be included in connection with a kit as heretofore described. The third composition may include a reducing agent and one or more of the other adjuncts, such as a buffering agent or anti-pit agent, in different proportions than are found in the second composition. This is because the rate at which the reducing agent is consumed may be different from the rates at which one or more of the other ingredients are consumed or inactivated during the electroless nickel plating composition. When provided as a third composition, the functional components may be employed at a higher concentration, such as 2-50 times or preferably 5-25 times the amount of reducing agent, that may be used in ordinary commercial use. The other components may be present in greater or lesser amounts as may be found desirable or suitable.

The electroless nickel plating composition may include other components, such as other adjuncts or other functional components, which may be employed for any purpose suitable to achieve the intended purposes of such component.

It is believed that the electroless nickel plating compositions described herein will exhibit leveling. With reference to the Figures, for instance, a rough and irregular surface 10 is shown. This surface has visible imperfections, and, upon plating, it will be desirable to smooth these imperfections such that the plated surface is more even and less irregular. As seen in FIG. 3, when the plating 12 is applied, the surface becomes more smooth and less irregular.

The following parameters are based on applications of the mirror-bright, leveling electroless nickel, described in this application, deposited on steel test panels with no prior surface treatment. These parameters are exemplary and are not intended to be limiting. By utilizing the electroless nickel procedure, the reflectivity and surface condition of the treated materials can be significantly improved. In one form, the improvement is a function of thickness coating. It was unexpectedly found that coatings with thicknesses greater than 2 μm will suffice in comparison to conventional electro-plated coatings that typically require coating thicknesses in excess of 20 μm. The electroless nickel deposit can be used to provide a uniform, micro-leveling, surface brightening affect that improves overall reflectivity 60-80% over conventional electroless nickel systems. In other forms, the overall reflectivity can be improved by about 80-100%. Similarly, surface roughness conditions can be improved (decreased values) from 20-40% in measured rA (surface roughness) readings.

In another form, when the chemical polishing procedure is utilized prior to mirror-bright, leveling electroless nickel coating, steel samples have shown a 70-100% improvement in both the rA (surface roughness) and total gloss/reflectivity (measured in GU) compared to utilizing just one of the chemical polishing and electroless nickel procedures separately. In one form, when used in combination as outlined above, the steel samples had excellent adhesion, uniform coverage, reflectivity, surface roughness, wear and corrosion resistance regardless of the complexity of the shape. The corrosion resistance compared with conventional polished nickel systems improved from several hours utilizing conventional nickel to 120 hrs. of saltspray protection as outlined in method ASTM B-117.

It should be understood that the chemical polishing solution and methods may be used with other forms of coating or plating. For example, while it has been found that the chemical polishing described above can be useful with the particular forms of electroless nickel plating described above, it should be understood that the chemical polishing may also be used with other forms of electroless. Further, the chemical polishing may be used with other forms of coating or plating, such as electrolytic coating.

The following Examples are provided to illustrate certain embodiments of the invention, but are not intended to limit the invention in scope.

EXAMPLES

Solution A was used in connection with Examples 1 and 2 and with Comparative Examples 1 and 2. This solution was composed of water and Nickel sulfate hexahydrate, with the nickel sulfate hexahydrate added in the amount of 270 gm/L (correlating to 60 gm/L nickel). This hexahydrate was added as a powder.

Comparative Example 1

To a 100 mL sample of Solution A was added 1 mL of 10 gm/L IGEPAL CO-630 (nonyl-phenoxypolyethoxyethanol HLB 13.0). A permanent cloudy solution formed, thus indicating oil-out of the surfactant.

Example 1

To a 100 mL, sample of Solution A was added 1 mL of 10 gm/L IGEPAL CO-630 plus 60 gm/L RHODACAL N (Naphtalene sulfonate coupler). The resulting solution remained clear green, thus indicating that the solution was homogeneous and stable. This solution contained 100 mg/L of IGEPAL CO-630, 600 mg/L of RHODACAL N, and 60 gm/L nickel.

Comparative Example 2

To a 100 mL sample of Solution A was added 1 mL of 10 gm/L IGEPAL CA-630 (octyl-phenoxypolyethoxyethanol HLB 13.0). A permanent cloudy solution formed, thus indicating oil-out of the surfactant.

Example 2

To a 100 mL sample of Solution A was added 1 mL of 10 gm/L IGEPAL CA-630 pins 60 gm/L RHODACAL N (naphthalene sulfonate coupler). The resulting solution remained clear green, thus indicating that the solution was homogeneous and stable. This solution contained 100 mg/L of IGEPAL CA-630, 600 mg/L of RHODACAL N, and 60 gm/L nickel.

Solution B was used in connection with Example 3 and Comparative Example 3. This solution was composed of sodium hypophosphite monohydrate added to water in the amount of 300 gm/L.

Comparative Example 3

To a 100 mL sample of Solution B was added 1 mL of 10 gm/L Bismuth Nitrate Pentahydrate and 1 mL of 3 gm/L thiourea. After 24 hours of storage, the clear solution became cloudy grey indicating the precipitation of insoluble bismuth sulfide particles.

Example 3

To a 100 mL sample of Solution B was added 1 mL of 50 gm/L sodium nitrilotriacetate, 1 mL of 10 gm/L bismuth nitrate Pentahydrate, 1 mL of 3 mg/L thiourea. After 2 weeks of storage, the solution remained water-clear with no precipitation of bismuth.

Solution C was used in connection with Examples 4-6 and in connection with Comparative Examples 4-6. This solution had the following composition and a pH of 5.0.

TABLE 1

| Nickel Sulfate Hexahydrate | 30 g/L |
|---|---|
| Lactic Acid | 15 g/L |
| Malic Acid | 15 g/L |
| Glycine | 5 g/L |
| Acetic Acid | 5 g/L |
| Boric Acid | 5 g/L |
| Sodium Hypophosphite | 30 g/L |
| Potassium Iodate | 0.02 g/L |
| Sodium Nitrilotriacetate | 0.04 g/L |

In the following examples, low-carbon polished steel test panels 3" by 4" were cleaned and acid activated in a 50% hydrochloric acid solution, then thoroughly rinsed with deionized water and immersed in the electroless nickel plating solution for 1 hour at 190° F. After plating, the nickel-plated test panels were rinsed with deionized water and hot air dried. The plating deposit thickness was measured and the panel appearance was evaluated.

Comparative Example 4

To 1 liter of Solution C was added 5 mg of bismuth nitrate pentahydrate hydrate, 0.3 mg of thiourea, and 20 mg of octylphenoxypolyethoxyethanol IGEPAL CA-630. The nickel deposit thickness was 0.00080 inches and the panel appearance was bright with low luster, no leveling, and some cloudiness from oil out of the Surfactant Brightener I.

Example 4

An addition of 100 mg of RHODACAL N was made to the solution of Comparative Example 4. The nickel and hypophosphite concentrations were replenished by analysis and additions, and the pH was adjusted back to 5.0 with 50% ammonium hydroxide. After plating, the nickel deposit thickness was 0.00084 inches and the panel appearance was mirror bright with no cloudiness or streaking.

Comparative Example 5

To a fresh 1 liter of Solution C was added, 0.5 mg of thiourea, 20 mg of IGEPAL CA-630, 100 mg of RHODACAL N and no bismuth. The nickel deposit thickness was 0.00086 inches and the panel appearance was uniform low luster brightness with no cloudiness or hazing.

Example 5

An addition of 5 mg of bismuth nitrate pentahydrate was made to the solution of Comparative Example 5. The nickel and hypophosphite concentrations were replenished by analysis and additions and the pH was adjusted back to 5.0 with 50% ammonium hydroxide. After plating, the nickel deposit thickness was 0.00084 inches and the panel appearance was uniform mirror bright with no cloudiness or streaking.

Comparative Example 6

To a fresh 1 liter of Solution C was added 5 mg of bismuth nitrate pentahydrate, 20 mg of IGEPAL CA-630, 100 mg of RHODACAL N and no thiourea. The nickel deposit thickness was 0.00078 inches and the panel appearance was uniform semi-bright with some graininess and no leveling.

Example 6

An addition of 0.3 mg of thiourea was made to the solution of Comparative Example 6. The nickel and hypophosphite concentrations were replenished and the pH was adjusted to 5.0 with 50% ammonium hydroxide. After plating, the nickel deposit thickness was 0.00085 and the panel appearance was uniform mirror bright with no cloudiness or streaking.

Example 7

Example 7 was prepared with numerous samples to compare the effect of different concentrations of various ingredients during the chemical polishing process. Each of the sample solutions were tested on steel panels which are pre-scratched on one side from the manufacturer. The steel is CRS SAE 1008/1010 that is 0.032" thick (0.8 mm) with a ground finish on one side. The steel panels are washed in a mild detergent, rinsed and then polished using the chemical polishing compositions. The steel panels were chemically polished using the compositions and processing times as shown in Table 2. The gloss (per the gloss meter) and surface roughness (per the profilometer) for each of the sample compositions is shown in Table 3. The samples were polished, but were not plated.

TABLE 2

Treatment Solutions and Processing Conditions for Example 7 (Concentrations given in g/l)

| Sample | Ammonium bifluroide | Sodium nitrate | Oxalic acid | Surfactant | Hydrogen Peroxide | Fluoroboric Acid | ° F. | Immersion Time |
|---|---|---|---|---|---|---|---|---|
| 7-1 | 14.97 | 12.00 | 3.00 | 0.03 | 160.00 | 40.00 | 75 | 30 Sec |
| 7-2 | 14.97 | 12.00 | 3.00 | 0.03 | 160.00 | 40.00 | 75 | 60 Sec |
| 7-3 | 29.94 | 24.00 | 6.00 | 0.06 | 160.00 | 40.00 | 75 | 30 Sec |
| 7-4 | 29.94 | 24.00 | 6.00 | 0.06 | 160.00 | 40.00 | 75 | 60 Sec |
| 7-5 | 29.94 | 24.00 | 6.00 | 0.06 | 160.00 | 40.00 | 75 | 120 Sec |
| 7-6 | 37.43 | 30.00 | 7.50 | 0.08 | 160.00 | 40.00 | 75 | 30 Sec |
| 7-7 | 37.43 | 30.00 | 7.50 | 0.08 | 160.00 | 40.00 | 75 | 60 Sec |
| 7-8 | 29.94 | 24.00 | 6.00 | 0.06 | 240.00 | 60.00 | 75 | 30 Sec |

TABLE 3

Gloss and Surface Roughness of Polished Steel Panels

| | GLOSS (Gloss Units GU) | | PROFILOMETER (Roughness Average $R_A$) | |
|---|---|---|---|---|
| Sample | Unscratched Side of Test Panel Side A | Prescratched Side of Test Panel Side B | Unscratched Side of Test Panel Side A | Prescratched Side of Test Panel Side B |
| 7-1 | 41 | 27 | 0.78 | 0.96 |
| 7-2 | 27 | 52 | 0.88 | 0.95 |
| 7-3 | 60 | 35 | 0.63 | 0.99 |
| 7-4 | 41 | 57 | 0.75 | 0.86 |
| 7-5 | 106 | 138 | 0.42 | 0.57 |
| 7-6 | 110 | 125 | 0.37 | 0.46 |
| 7-7 | 118 | 134 | 0.33 | 0.4 |
| 7-8 | 75 | 49 | 0.77 | 0.89 |

The results found in Table 3 show the unscratched side as side "A" while the prescratched side as side "B". As found in Table 3, not only does the breakdown of the chemical polishing impact the gloss and surface roughness, but the exposure time also impacted the gloss and surface roughness. The gloss measurement was made using a standard glossmeter while the surface roughness was determined using a contact profilometer. The higher the gloss number, the higher the gloss, while the higher the profilometer number, the larger the surface roughness. In one form, it is desirable to increase the gloss while reducing the surface roughness. It should be understood that the breakdown of the chemical polishing composition and the processing time can be modified to achieve the desired gloss and surface roughness.

All of the above results (Table 3) characterize the benefits of the described surface treatment application on steel, without nickel plating.

Example 8

In Example 8, a number of different nickel coatings were compared, with and without chemical polishing prior to the nickel coatings. The same type of steel panels from Example 7 were used in Example 8 to compare the different compositions and processes. Nine different combinations of processes, coatings and chemical polishing steps were compared as shown in Tables 4, 5 and 6. The nickel coating processes used in the samples differed in a number of ways.

Sample 8-1 was prepared without chemical polishing. Sample 8-1 was nickel coated by plating in a non-leveling conventional electroless nickel solution, Accu-Labs 392 (available from Accu-Labs, Inc. of Chicago, Ill.), for a plating time of 20 minutes.

The sample 8-2 was prepared without chemical polishing. Sample 8-2 was nickel coated by electrolytic plating in a conventional high-chloride watts nickel plating solution to produce a bright nickel deposit. The nickel plating solution included: 90 gram/liter nickel chloride; 285 gram/liter nickel sulfate; 45 gram/liter boric acid; 2 gram/liter saccharin; 5 mL/liter Accu-Labs NILUX NXZ Brightener Additive; 20 mL/liter Accu-Labs NILUX Z-2 Carrier Additive (both available from Accu-Labs, Inc. of Chicago, Ill). The test panel was plated for 10 minutes using a hull cell.

Sample 8-3 was prepared without chemical polishing. Sample 8-3 was nickel coated by electrolytic plating in a conventional low-chloride watts nickel plating solution to produce a bright nickel deposit. The nickel plating solution included 45 gram/liter nickel chloride; 285 gram/liter nickel sulfate; 45 gram/liter boric acid; 2 gram/liter saccharin; 5 mL/liter Accu-Labs NILUX NXZ Brightener Additive; 20 mL/liter Accu-Labs NILUX Z-2 Carrier Additive. The test panel was plated for 10 minutes using a hull cell.

Sample 8-4 was prepared without chemical polishing. Sample 8-4 was nickel coated by electrolytic plating in a conventional bright nickel sulfamate plating solution to produce a bright nickel deposit. The nickel sulfamate plating solution included: 315 grams/liter nickel sulfamate; 22.5 gram/liter nickel bromide; 45 gram/liter boric acid; 10 mL/liter Accu-Labs NILUX SNS Brightener Additive; 40 mL/liter Accu-Labs NILUX SNS Carrier Additive. The test panel was plated for 10 minutes using a hull cell.

Samples 8-5 and 8-6 were prepared without chemical polishing. Sample 8-5 and 8-6 were nickel coated in a mirror-bright, leveling electroless nickel plating solution as described in Table 1 and including the chemical additives described in Comparative Example 4 and Example 4. A one liter solution of the mirror-bright leveling electroless nickel solution at 190° F. and pH 4.8 was used to nickel coat the sample panels for the times listed on Table 4.

Samples 8-7, 8-8 and 8-9 were all processed with the chemical polish solution before nickel coating with the mirror-bright leveling electroless nickel solution. The chemical polish solution used for surface treatment of the Samples 8-7, 8-8 and 8-9 was the same as described for Sample 7-5 in Table 2. The times for surface treatment of each panel are given in Table 4. The subsequent nickel coating of Samples 8-7, 8-8 and 8-9 was produced by using the mirror-bright leveling electroless nickel solution described in Table 1 and including the chemical additives described in Comparative Example 4 and Example 4, at 190° F. and pH 4.8. The times used to nickel coat samples 8-7, 8-8 and 8-9 are given in Table 4.

TABLE 4

Gloss Meter Results for Nickel Coatings Example 8

| | PANEL DESCRIPTION | | | | Gloss Meter Results (Gloss Units GU) | | | | PERCENT DIFFERENCE CALCULATIONS | | | |
| | | | | | A SIDE | | B SIDE | | | | | |
| | Steel Chemical | Nickel | Plating | Plating | Unscratched | | Prescratched | | Difference | | % Difference | |
| Sample | Polish Before Plating | Coating Solution | Time (mins) | Solution Age (MTO) | Untreated Unplated | After Plating | Untreated Unplated | After Plating | A side | B side | A side | B side |
| 8-1 | None | Electroless Non-Leveling | 20 | 5 | 17 | 19 | 25 | 15 | 2 | −10 | 11.76 | −40.00 |
| 8-2 | None | Electrolytic High-Chloride | 10 | NA | 15 | 51 | 13 | 49 | 36 | 36 | 240.00 | 276.92 |
| 8-3 | None | Electrolytic Low-Chloride | 10 | NA | 14 | 25 | 13 | 22 | 11 | 9 | 78.57 | 69.23 |
| 8-4 | None | Electrolytic Sulfamate | 10 | NA | 16 | 30 | 12 | 20 | 14 | 8 | 87.50 | 66.67 |
| 8-5 | None | Electroless Bright-Leveling | 20 | 5 | 15 | 31 | 12 | 35 | 16 | 23 | 106.67 | 191.67 |
| 8-6 | None | Electroless Bright-Leveling | 30 | 5 | 17 | 63 | 14 | 79 | 46 | 65 | 270.59 | 464.29 |
| 8-7 | 60 sec | Electroless Bright-Leveling | 20 | 5 | 21 | 107 | 14 | 109 | 86 | 95 | 409.52 | 678.57 |
| 8-8 | 45 sec | Electroless Bright-Leveling | 20 | 5 | 13 | 87 | 14 | 80 | 74 | 66 | 569.23 | 471.43 |

TABLE 4-continued

Gloss Meter Results for Nickel Coatings Example 8

| | PANEL DESCRIPTION | | | | Gloss Meter Results (Gloss Units GU) | | | | PERCENT DIFFERENCE CALCULATIONS | | | |
|---|---|---|---|---|---|---|---|---|---|---|---|---|
| | | | | | A SIDE Unscratched | | B SIDE Prescratched | | Difference | | % Difference | |
| Sample | Steel Chemical Polish Before Plating | Nickel Coating Solution | Plating Time (mins) | Plating Solution Age (MTO) | Untreated Unplated | After Plating | Untreated Unplated | After Plating | A side | B side | A side | B side |
| 8-9 | 30 sec | Electroless Bright-Leveling | 20 | 5 | 18 | 91 | 15 | 95 | 73 | 80 | 405.56 | 533.33 |

TABLE 5

Profilometer (Roughness) Measurements for Nickel Coatings Example 8

| | PANEL DESCRIPTION | | | | Profilometer Results (Roughness $_R$A) | | | | PERCENT DIFFERENCE CALCULATIONS | | | |
|---|---|---|---|---|---|---|---|---|---|---|---|---|
| | | | | | A SIDE Unscratched | | B SIDE Prescratched | | Difference | | % Difference | |
| Sample | Steel Chemical Polish Before Plating | Nickel Coating Solution | Plating Time (mins) | Plating Solution Age (MTO) | Untreated Unplated | After Plating | Untreated Unplated | After Plating | A side | B side | A side | B side |
| 8-1 | None | Electroless Non-Leveling | 20 | 5 | 1.19 | 1.34 | 0.96 | 0.72 | 0.15 | −0.24 | 12.61 | −25.00 |
| 8-2 | None | Electrolytic High-Chloride | 10 | NA | 1.33 | 1.08 | 1.01 | 0.81 | −0.25 | −0.2 | −18.80 | −19.80 |
| 8-3 | None | Electrolytic Low-Chloride | 10 | NA | 1.31 | 1.27 | 1.1 | 0.94 | −0.04 | −0.16 | −3.05 | −14.55 |
| 8-4 | None | Electrolytic Sulfamate | 10 | NA | 1.25 | 1.33 | 1.04 | 0.94 | 0.08 | −0.1 | 6.40 | −9.62 |
| 8-5 | None | Electroless Bright-Leveling | 20 | 5 | 1.53 | 1.24 | 1.02 | 0.91 | −0.29 | −0.11 | −18.95 | −10.78 |
| 8-6 | None | Electroless Bright-Leveling | 30 | 5 | 1.23 | 0.88 | 0.84 | 0.66 | −0.35 | −0.18 | −28.46 | −21.43 |
| 8-7 | 60 sec | Electroless Bright-Leveling | 20 | 5 | 1.23 | 0.61 | 0.95 | 0.45 | −0.62 | −0.5 | −50.41 | −52.63 |
| 8-8 | 45 sec | Electroless Bright-Leveling | 20 | 5 | 1.3 | 0.59 | 0.85 | 0.2 | −0.71 | −0.65 | −54.62 | −76.47 |
| 8-9 | 30 sec | Electroless Bright-Leveling | 20 | 5 | 1.28 | 0.6 | 0.89 | 0.55 | −0.68 | −0.34 | −53.13 | −38.20 |

TABLE 6

Nickel Coating Thickness Example 8

| Sample | Nickel Coating | THICKNESS (A-side) Micro-Inches |
|---|---|---|
| 8-1 | Electroless Non-Leveling | 244 |
| 8-2 | Electrolytic High-Chloride | 533 |
| 8-3 | Electrolytic Low-Chloride | 580 |
| 8-4 | Electrolytic Sulfamate | 520 |
| 8-5 | Electroless Bright-Leveling | 230 |
| 8-6 | Electroless Bright-Leveling | 368 |
| 8-7 | Electroless Bright-Leveling | 231 |
| 8-8 | Electroless Bright-Leveling | 258 |
| 8-9 | Electroless Bright-Leveling | 260 |

TABLE 7

Corrosion Resistance Test Results Example 8

| | | Salt Spray Hrs. To Red Rust (RR) | | | |
|---|---|---|---|---|---|
| Sample | Nickel Coating | 24 HRS | 48 HRS | 72 HRS | 96 HRS |
| 8-1 | Electroless Non-Leveling | RR | RR | RR | RR |
| 8-2 | Electrolytic High-Chloride | RR | RR | RR | RR |
| 8-3 | Electrolytic Low-Chloride | RR | RR | RR | RR |
| 8-4 | Electrolytic Sulfamate | RR | RR | RR | RR |
| 8-7 | Electroless Bright-Leveling | NC | NC | NC | NC |
| 8-8 | Electroless Bright-Leveling | NC | NC | NC | NC |
| 8-9 | Electroless Bright-Leveling | NC | NC | Trace | Trace |

Salt spray per ASTM B-117; NC = No Corrosion, RR = Rust Failure, Trace = Less than 0.2% of surface with detectable red rust.

As found in Tables 4-6, the samples which were chemically polished prior to nickel plating achieved significantly improved gloss with reduced surface roughness compared to other samples. Moreover, the chemically polished samples were able to achieve such properties with decreased thickness. In other words, the chemically polished samples required less nickel to achieve the gloss and surface roughness properties.

Typically, to achieve the gloss and surface roughness properties achieved in the above examples, it is necessary to mechanically polish the steel surface and/or to use significant amounts of nickel. In one form, the present combination of chemical polishing and electroless nickel plating is able to achieve improved gloss and surface roughness while also reducing overall nickel coating by at least about 50%. Moreover, the processes are not limited by the geometries of the parts that are being polished and coated. The chemical polishing and electroless nickel plating processes are suitable for use with parts having complicated geometries and are capable of reacting with surfaces that would otherwise be difficult to reach with mechanical polishing and/or would be difficult to plate using a nickel process that requires electricity. Moreover, in one form, the chemical polishing and electroless nickel plating processes are suitable with fragile parts where mechanical polishing could cause damage and traditional polishing may result in an undesired build up of plated nickel.

It is thus seen that the invention provides, in various embodiments, kits, methods, and compositions useful in the field of electroless nickel plating. In many embodiments, the kits, methods, and compositions provide good electroless nickel plating characteristics, and are ROHS compliant.

All references cited herein are hereby incorporated by reference in their entireties.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

The invention claimed is:

1. A kit comprising:
   a first container containing a first composition and a second container containing a second composition, said first composition containing nickel and said second composition containing a reducing agent, said first and second compositions being combinable to form an electroless nickel plating composition;
   said first composition containing a surfactant-brightener, said surfactant-brightener being present in an amount effective to enhance luster of an object plated with said electroless nickel plating composition, and a coupler, said coupler being present in an amount effective to inhibit oil-out of said surfactant-brightener.

2. A kit comprising: a first container containing a first composition and a second container containing a second composition, said first composition containing nickel and said second composition containing a reducing agent, said first and second compositions being combinable to form an electroless nickel plating composition; said second composition containing a bismuth metallic stabilizer in an amount effective to inhibit plate-out of said electroless nickel plating composition, and a bismuth complexer, said bismuth complexer being present in an amount effective to inhibit precipitation of bismuth.

3. A kit according to claim 2, said second composition further containing an organosulfur stabilizer in an amount effective to inhibit plate-out of said electroless nickel plating composition.

4. A kit according to claim 1, said surfactant-brightener being selected from the group consisting of nonyl and octyl-phenoxypolyethoxyethanol surfactants having an HLB ranging from about 12.0 to about 18.0.

5. A kit according to claim 1, said coupler being selected from the group consisting of naphthalene sulfonates.

6. A kit according to claim 2, said bismuth complexer comprising sodium nitrilotriacetate.

7. A kit according to claim 1, said first composition comprising nickel sulfate.

8. A kit according to claim 1, said reducing agent being selected from the group consisting of sodium, potassium, and ammonium hypophosphite.

9. A kit according to claim 2, said first composition comprising nickel sulfate.

10. A kit according to claim 2, said reducing agent being selected from the group consisting of sodium, potassium, and ammonium hypophosphite.

11. A kit according to claim 2, said second composition further comprising at least one of a pH buffer and an anti-pit agent, said kit further comprising a third container containing a third composition, said third composition comprising a reducing agent and at least one of a pH buffer and an anti-pit agent, the proportion of said reducing agent to said at least one of buffer and anti-pit agent being different from the proportion of reducing agent to said at least one of buffer and anti-pit agent in said second composition.

12. A method of preparing an electroless nickel plating composition, the method comprising:
   providing a kit, said kit comprising a first container containing a first composition and a second container containing a second composition, said first composition containing nickel and said second composition containing a reducing agent, said first and second compositions being combinable to form an electroless nickel plating composition; and
   mixing said first composition with said second composition to form an electroless nickel plating composition;

said first composition containing a surfactant-brightener, said surfactant-brightener being present in an amount effective to enhance luster of an object plated with said electroless nickel plating composition, and a coupler, said coupler being present in an amount effective to inhibit oil-out of said surfactant-brightener.

13. A method according to claim 12, said surfactant-brightener being selected from the group consisting of nonyl and octyl-phenoxypolyethoxyethanol surfactants having an HLB ranging from about 12.0 to about 18.0.

14. A method according to claim 12, said coupler being selected from the group consisting of naphthalene sulfonates.

15. A method according to claim 12, said first composition comprising nickel sulfate.

16. A method according to claim 12, said reducing agent being selected from the group consisting of sodium, potassium, and ammonium hypophosphite.

17. A method for forming an electroless nickel plating composition, comprising;
    providing a kit, said kit comprising a first container containing a first composition and a second container containing a second composition, said first composition containing nickel and said second composition containing a reducing agent, said first and second compositions being combinable to form an electroless nickel plating composition;
    said second composition containing a bismuth metallic stabilizer in an amount effective to inhibit plate-out of said electroless nickel plating composition, and a bismuth complexer,
said bismuth complexer being present in an amount effective to inhibit precipitation of bismuth; and mixing said first composition and said second composition to form an electroless nickel plating composition.

18. A method according to claim 17, said second composition further containing an organosulfur stabilizer in an amount effective to inhibit plate-out of said electroless nickel plating composition.

19. A method according to claim 17, said bismuth complexer comprising sodium nitrilotriacetate.

20. A method according to claim 17, said first composition comprising nickel sulfate.

21. A method according to claim 17, said reducing agent being selected from the group consisting of sodium, potassium, and ammonium hypophosphite.

22. A method comprising:
    providing an electroless nickel plating composition, said composition comprising nickel; a reducing agent; a surfactant-brightener, said surfactant-brightener being present in an amount effective to enhance luster of an object plated with said electroless nickel plating composition; and a coupler, said coupler being present in an amount effective to inhibit oil-out of said surfactant-brightener; and introducing an object to said electroless nickel plating composition under conditions suitable to cause nickel plating on a surface of said object.

23. A method according to claim 22, further comprising replenishing said electroless nickel plating composition with a composition that comprises a reducing agent and at least one of a pH buffer and an anti-pit agent.

24. A method comprising:
    providing an electroless nickel plating composition, said composition comprising nickel; a reducing agent; a bismuth metallic stabilizer, said bismuth metallic stabilizer being present in an amount effective to inhibit plate-out of said electroless nickel plating composition, the mass of nickel in said composition exceeding the mass of bismuth; and a bismuth complexer, said bismuth complexer being present in an amount effective to inhibit precipitation of bismuth; and
    introducing an object to said electroless nickel plating composition under conditions suitable to cause nickel plating on a surface of said object.

25. A method according to claim 24, said electroless nickel plating composition further containing an organosulfur stabilizer in an amount effective to inhibit plate-out of said electroless nickel plating composition.

26. A method according to claim 25, said bismuth complexer comprising sodium nitrilotriacetate.

27. A method according to claim 24, said reducing agent being selected from the group consisting of sodium, potassium, and ammonium hypophosphite.

28. A method according to claim 24, the method further comprising replenishing said electroless nickel plating composition with a composition that comprises a reducing agent and at least one of a pH buffer and an anti-pit agent.

* * * * *